United States Patent [19]

Robaina

[11] Patent Number: 5,507,503
[45] Date of Patent: Apr. 16, 1996

[54] STATIC SEAL IN COMBINATION WITH INTERENGAGED COMPONENTS HAVING COMPLEMENTARY DIAGONAL SURFACES

[75] Inventor: Jose M. Robaina, Simi Valley, Calif.

[73] Assignee: ITT Corporation, New York, N.Y.

[21] Appl. No.: 349,340

[22] Filed: Dec. 5, 1994

[51] Int. Cl.$^6$ ..................................... F16J 15/10
[52] U.S. Cl. .................. 277/165; 277/170; 277/188 R
[58] Field of Search ................................. 277/165, 167.5, 277/170, 207 A, 236, 171, 172, 182 R

[56] References Cited

U.S. PATENT DOCUMENTS

| | | | |
|---|---|---|---|
| 906,761 | 12/1908 | White | 277/236 |
| 927,611 | 7/1909 | Stallings | 277/188 R |
| 1,098,974 | 6/1914 | Reilly | 277/170 |
| 1,181,060 | 4/1916 | Bennett | 277/170 |
| 2,906,548 | 9/1959 | Faccou | 277/188 R |
| 2,989,209 | 6/1961 | Hersman | 277/170 |
| 3,865,387 | 2/1975 | Larker et al. | 277/190 |
| 4,346,903 | 8/1982 | Heiermann | 277/165 |
| 4,648,740 | 3/1987 | Carlson | 277/170 |
| 4,809,590 | 3/1989 | Naumann et al. | 277/170 |
| 5,029,878 | 7/1991 | Ray | 277/170 |
| 5,181,730 | 1/1993 | Hjertholm | 277/167.5 |
| 5,251,941 | 10/1993 | McGarvey | 277/167.5 |

FOREIGN PATENT DOCUMENTS 16104 of 1909 United Kingdom ................... 277/170

*Primary Examiner*—Scott W. Cummings
*Attorney, Agent, or Firm*—Menotti J. Lombardi

[57] ABSTRACT

A sealing element, formed of a substantially non-extrudable material, is configured with a taper at one edge or surface thereof. The element is set in a recess which obtains between interengaged components, with the tapered end exposed, externally. The tapered end is flat, and fairingly bridges across the recess to obviate any crevasses or notches, or voids in which product fluid can repose and create bacteria.

2 Claims, 2 Drawing Sheets

STATIC SEAL IN COMBINATION WITH INTERENGAGED COMPONENTS HAVING COMPLEMENTARY DIAGONAL SURFACES

BACKGROUND OF THE INVENTION

This invention pertains to means for forming a fluid seal in a void or recess which obtains between interengaged components, and in particular to such means which forms a static and sanitary seal, in a space, void or recess between such components which fairingly bridges across the space, void or recess to inhibit any collection of fluid thereat.

Typically, sealing means are embodied by an O-ring, used as a radial seal between interengaging components, the O-ring seal serving as a gland, or arranged as a face seal. Alternatively, such sealing means are provided by a flat gasket, in which the same serves as a face seal between the components. In the case where an O-ring is used to achieve a radial seal between interengaged components, it is necessary for the O-ring groove to be machined or formed so that it is somewhat below the outermost surfaces of the components. This is necessary to provide some manner of shoulder to keep the O-ring from extruding into the flow path of the fluid, as the O-ring is compressed, or extruded into the structures as a vacuum is created therewithin. The elastomers used for O-ring materials are flexible enough to extrude outwardly or inwardly, in the face of elevated or vacuum pressures. The distance between the face of the O-ring seal and the outermost surfaces of the interengaged, being-sealed components defines gaps and crevasses which will fill with product upon such product flowing thereacross. These gaps and crevasses are difficult and almost impossible to flush out and sterilize.

As pressures increase or decrease, within the being-sealed components, the O-ring moves back and forth, slightly, as it is compressed and allowed to expand due to the variances in the pressures, because of its highly elastic nature. As a consequence, small amounts of product become trapped in areas around or beneath the O-ring. Clearly, any bacteria that grows near or beneath the O-ring as a result of the entrapped product will be insulated from cleansing steam addressed to the site. Such O-ring sealing arrangements are most difficult or impossible to sanitize for, as noted, sanitizing steam will simply pass over the captured, shielded bacteria.

An O-ring seal used as a face seal also requires a same type of shoulder to retain it in place, and the aforesaid problems arise with this practice as well. Recesses, gaps and the like will be presented to collect fluid therein, and such discontinuities are fertile breeding grounds for tenacious bacteria.

A flat gasket used as a face seal is also subject to extrusion, inwardly or outwardly, under elevated or vacuum pressures due to its highly elastic nature. Also, because a flat gasket has to be compressed against comparatively large, flat surfaces, the use of such results in an arrangement that either has a significant, product-receptive recess at the outermost area of the structure, or defines gaps and crevasses such as are coincident with the O-ring sealing (as priorly noted), compromising the cleanliness and sterility of the arrangement.

In view of the aforenoted problems and disadvantages arising from the use of O-ring seals and/or flat gaskets, it is clear that there is an unmet need for a means for forming a static and sanitary seal which avoids the described problems and disadvantages.

SUMMARY OF THE INVENTION

It is an object of this invention to set forth a novel means for forming a static seal, and a sanitary seal, per se, and in combination with interengaged components. Particularly, it is an object of this invention to set forth means for forming a static seal in a recess between interengaging components, comprising a substantially non-extrudable, sealing element; wherein said element has a first surface for exposure thereof between said components in said recess, and fairingly bridging across said recess; said element has a second surface for interfacingly engaging a surface of one of said components; one of said first and second surfaces is flat; and the other of said first and second surfaces defines an obtuse angle relative to said one, flat surface.

Further objects of this invention, as well as the novel features thereof will become apparent by reference to the following description, taken in conjunction with the accompanying figures.

DETAILED DESCRIPTION OF THE PREFERRED EMBODIMENT

Figure 1:
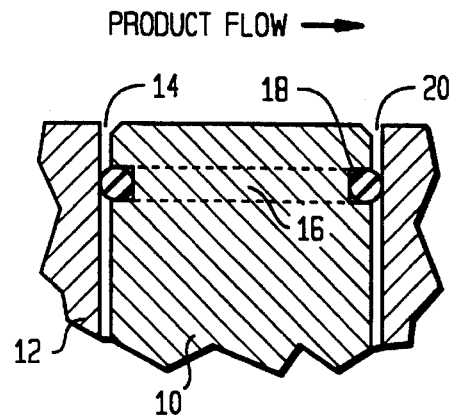
FIGS. 1 through 6 are partial, cross-sectional illustrations of prior art sealing arrangements for interengaged components.

FIG. 1 discloses interengaged male and female components 10 and 12, respectively, the two having an annular space or recess 14 therebetween. The male component 10 has an annular groove 16 formed therein in which an O-ring seal 18 is set. The groove 16, necessarily, has been formed somewhat inboard of the outermost surfaces of components 10 and 12, to keep the O-ring 18 captive. As a consequence, there is the annular gap 20 exposed to the product flow. The product, a liquid or vapor, can collect in the gap 20, and breed bacteria. Even when sterilizing steam is addressed to the outermost surfaces, and the gap 20, it will not necessarily sanitize the exposed surfaces and the minute, diminishing crevass which obtains between the radial outermost surface of the O-ring 18 and the confronting surface of the female component 12.

Figure 2:
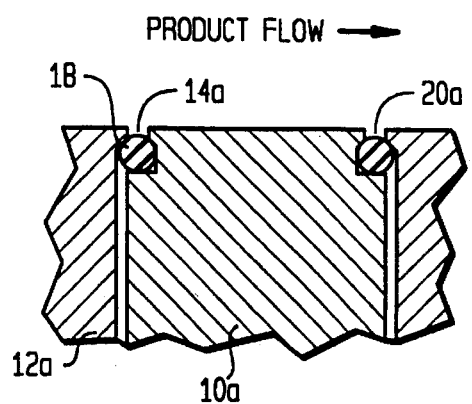

In the FIG. 2 arrangement the components 10a and 12a are both shaped by machining to define a captive arrangement for the O-ring 18, and to dispose the O-ring 18 more proximate to the outermost surfaces of the structure where the product flows. However, even with this concept, there remains a product-collecting gap 20a.

As priorly noted, with cyclical pressures of the product fluid, the flexible O-rings 18 will expand, contract, extrude and otherwise exercise, dynamically, and allow minute quantities of product fluid to insinuate themselves into the space or recess 14 and/or 14a, alongside the surfaces of the O-ring, or even therebehind where they will be substantially inextricable and unaffected by steam-cleaning sprays.

Figure 3:
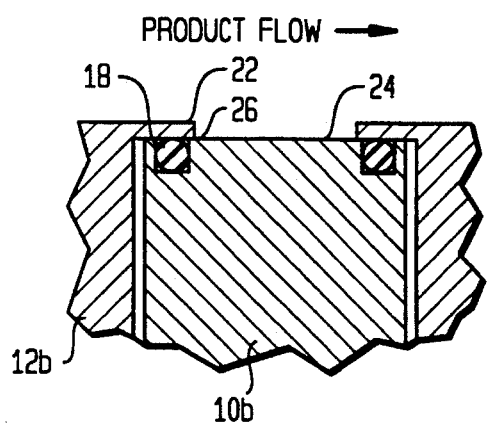
Figure 4:
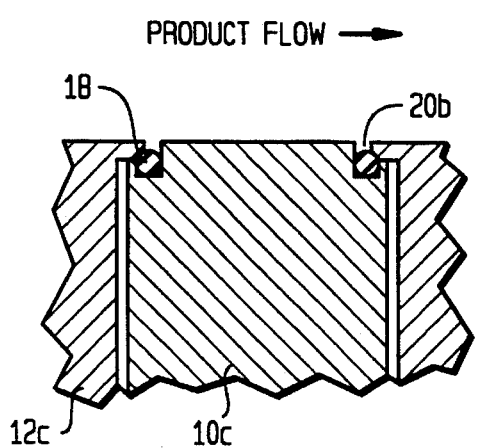

FIGS. 3 and 4 depict other, prior art arrangements in which O-ring seals are employed. In FIG. 3, the O-ring seal 18 is substantially encapsulated by an annular ledge 22 extending inwardly from the female component 12b. However, this configuration presents a large, recessed land 24, i.e., the outermost surface of the male component 10b, which subsists within the ledge 22. This land 24 can become a small reservoir for the product fluid, and of course, the jointing interface 26 of the ledge 22 and the land 24 presents an annular recess in which stale product can lodge and grow into bacteria.

The FIG. 4 arrangement is not greatly different from that depicted in FIG. 2, and it results in the same sort of problems. The O-ring will exercise, dynamically, to admit minute quantities of product therealong and perhaps therebehind, and again a product-collecting gap 20b is presented to the fluid flow.

Figure 5:
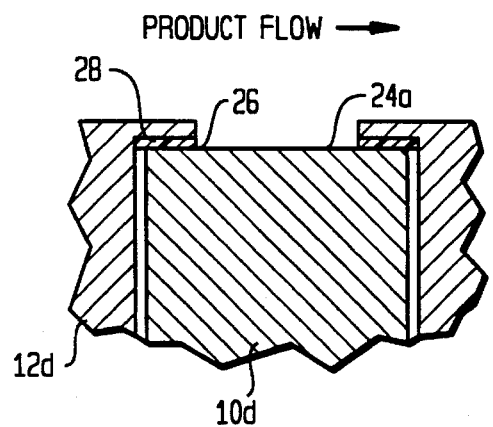
Figure 6:
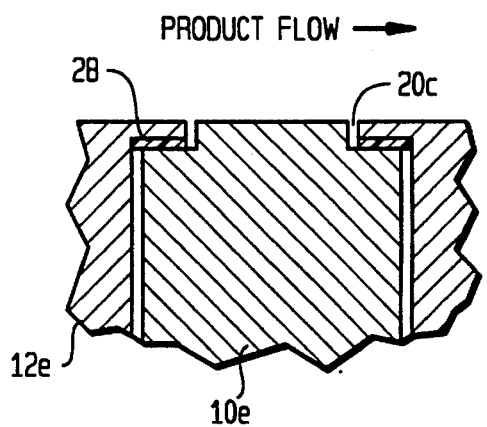

The use of flat gaskets, as shown in FIGS. 5 and 6 do little to ameliorate the problem. The flat gasket 28 in FIG. 5, for being highly elastic, is susceptible of extrusion the same as the O-rings. Too, this arrangement, similar to the FIG. 3 arrangement, presents a recessed land 24a which is not readily drainable, and which offers opportunity for bacteria growth.

The FIG. 6 construction is not dissimilar to the FIG. 4 arrangement. Here is a same gap 20c in which product will surely collect, and defy reasonable efforts to flush the same for sanitizing.

Figure 7:
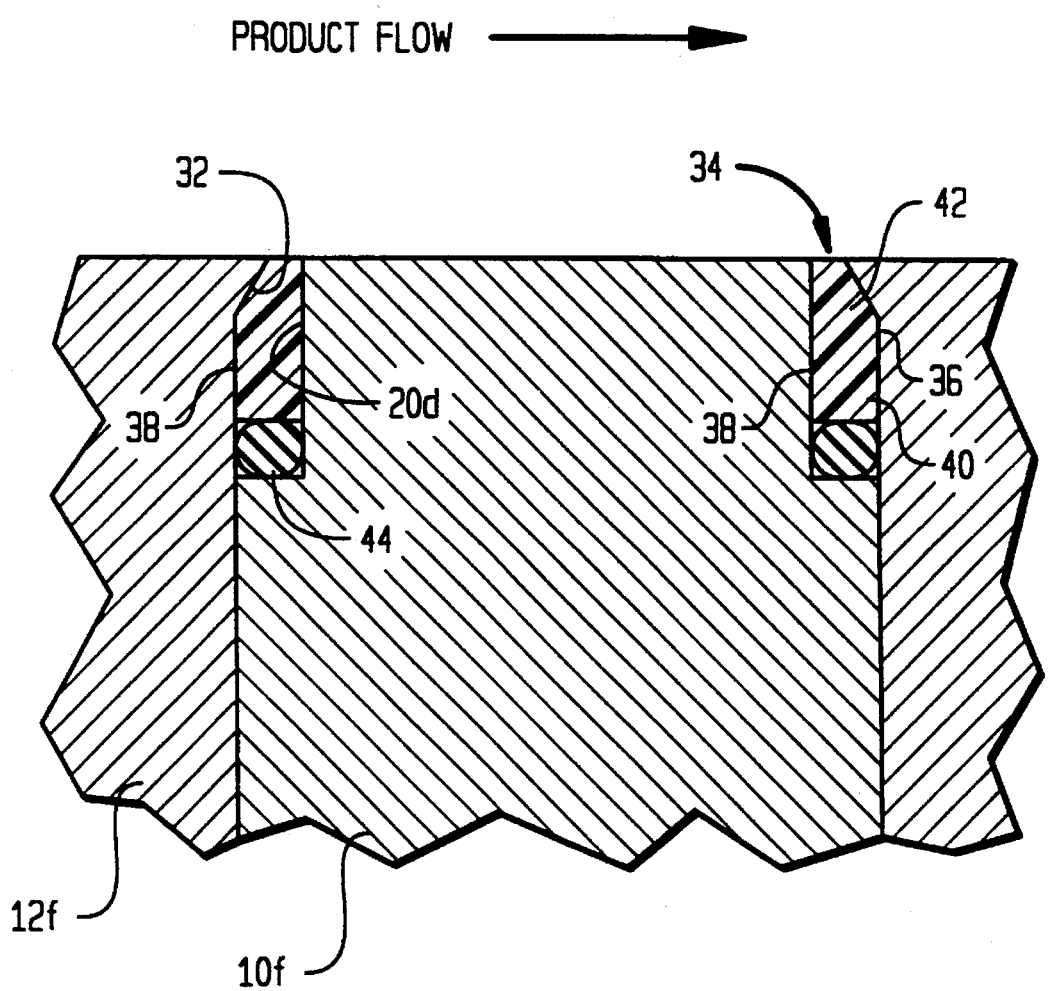
FIG. 7 is a partial, cross-sectional view of an embodiment of the invention.

The invention, then, as exemplified by an embodiment thereof in FIG. 7, substantially obviates the aforedescribed difficulties and problems. Here, the male and female components 10f and 12f, respectively, have an annular recess or gap 20d formed therebetween. In this recess 20d is disposed a substantially non-extrudable gasket, i.e., a teflon gasket 30. The female component 12f, in this embodiment, has an inwardly-directed, diagonal surface 32 at its outermost termination of the recess 20d. The gasket 30 has a first surface 34 which is externally exposed between the components 10f and 12f, and which fairingly bridges across the recess 20d; as a consequence, there obtains no crevass, no gap, no discontinuity of any sort in which product fluid can take refuge and occasion the growth of bacteria.

The sealing gasket 30 has a second surface 36 which comprises a diagonal shape complementary to surface 32, and which defines an obtuse angle relative to surface 34. Surface 36 interfacingly engages the confronting surface of female component 12f. Gasket 30 also has a radially innermost surface 38 which similarly effects an interfaced engagement thereof with the confronting surface of component 10f. This surface 38, a third surface of the novel gasket 30, defines a right angle with the first surface 34.

As can be seen, the gasket 30 has a first, innermost portion 40 of uniform width dimension, and a second, outermost portion 42 of uniformly varying width dimension. The latter defines the gasket with a taper which cooperates with the surface 32 to keep the gasket 30 captive in the recess 20d.

The FIG. 7 arrangement of the invention was designed so that the confronting edges of the male and female components 10f and 12f are as sharp as practical, and the configuration of the gap 20d is so defined as to insure that the exposed surface 34 of the gasket 30 is as small as possible. This provisioning, plus the flatness of the surface 34, virtually eliminates any crevasses or fluid traps for the product. The three, cooperating structures, the male component 10f, the gasket 30, and the female components 12f are tightly pressed or wedged against each other, and a smooth, faired, continuum is presented to the product flow. By keeping the exposed surface 34 of the gasket 30 to a minimum, and by making the gasket 30 out of an non-extrudable material, such as teflon, for example, the chances of extruding the gasket material into the flow path are virtually nil. An O-ring 44, or spring washer, or other such device can be installed behind the sealing gasket 30, in the bottom of the recess 20d, not as a sealing means, but as a method for compensating for any thermal displacement of the structures involved.

This novel sealing means can find especial use in any situation where a static, sanitary seal is necessary, and where drainability, or a flush, faired internal surface is imperative. Examples of such applications might be instrument ports, such as gage tees, sight glass fittings, in-line tube or pipe fittings, and covers for valves or other miscellaneous containers or vessels such as filter housings, pumps, and the like.

While I have described my invention in connection with a specific embodiment thereof, it is to be clearly understood that this is done only by way of example, and not as a limitation to the scope of the invention as set forth in the objects thereof, and in the appended claims.

I claim:

1. A static and stationary seal in a recess between interengaged components which bridges the recess to inhibit any collection of a fluid thereat, comprising in combination:

a male and a female component having an annular recess formed therebetween;

a substantially non-extrudable plastic gasket disposed in said recess;

said female component having an inwardly-directed, diagonal surface at the outermost termination of said recess;

said gasket having a first surface which is externally exposed between said male and female components which bridges across said recess without discontinuity, and said gasket having a second surface with a diagonal complementary surface to interfacingly engage said female component diagonal surface;

a third surface of said gasket engages a confronting surface of said male component, and said third surface defines a right angle with said first surface;

said gasket having an innermost portion of uniform width and an outermost portion of uniformly varying width which defines a taper which in cooperation with said female component diagonal surface maintains the gasket captive in said recess; and an O-ring positioned between the bottom of said recess and the bottom of the innermost portion of said gasket to compensate for thermal displacement of said components and gasket.

2. The combination according to claim 1, wherein said gasket is a teflon gasket.

\* \* \* \* \*